(12) United States Patent
Tietsch et al.

(10) Patent No.: US 9,350,870 B2
(45) Date of Patent: May 24, 2016

(54) METHOD FOR SETTING UP A COMMUNICATION LINK

(75) Inventors: Michael Tietsch, Kaufering (DE); Karl Klaghofer, Munich (DE); Holger Prange, Munich (DE)

(73) Assignee: Unify GmbH & Co. KG, Munich (DE)

( * ) Notice: Subject to any disclaimer, the term of this patent is extended or adjusted under 35 U.S.C. 154(b) by 95 days.

(21) Appl. No.: 13/985,076

(22) PCT Filed: Mar. 16, 2011

(86) PCT No.: PCT/EP2011/001306
§ 371 (c)(1),
(2), (4) Date: Aug. 13, 2013

(87) PCT Pub. No.: WO2012/123001
PCT Pub. Date: Sep. 20, 2012

(65) Prior Publication Data
US 2013/0322433 A1 Dec. 5, 2013

(51) Int. Cl.
*H04L 12/66* (2006.01)
*H04M 7/00* (2006.01)
*H04L 29/06* (2006.01)

(52) U.S. Cl.
CPC ........... *H04M 7/006* (2013.01); *H04L 65/1006* (2013.01); *H04L 65/1016* (2013.01); *H04L 65/1069* (2013.01); *H04L 65/80* (2013.01)

(58) Field of Classification Search
CPC ......... H04L 12/64; H04L 45/30; H04L 45/50; H04L 47/785; H04L 65/80; H04L 65/104; H04L 65/1069
See application file for complete search history.

(56) References Cited

U.S. PATENT DOCUMENTS

| 7,383,048 | B2 * | 6/2008 | Jouppi et al. ............... 455/452.2 |
| 7,492,787 | B2 * | 2/2009 | Ji et al. ............................ 370/466 |
| 7,496,192 | B1 * | 2/2009 | Sylvain ..................... 379/221.01 |
| 7,593,419 | B2 * | 9/2009 | Horvath et al. ............... 370/433 |
| 7,710,873 | B2 * | 5/2010 | Pulkka et al. ................. 370/235 |
| 8,301,744 | B2 * | 10/2012 | Bogovic et al. ............... 709/223 |
| 8,340,104 | B2 * | 12/2012 | Kusama et al. ............... 370/400 |
| 2002/0165966 | A1 | 11/2002 | Widegren et al. |
| 2004/0109455 | A1 | 6/2004 | Jouppi et al. |
| 2007/0226361 | A1 * | 9/2007 | Shaikh et al. ................. 709/230 |
| 2010/0036953 | A1 | 2/2010 | Bogovic et al. |

FOREIGN PATENT DOCUMENTS

| DE | 102006031080 A1 | 1/2008 |
| DE | 102008009925 A1 | 8/2009 |

OTHER PUBLICATIONS

Written Opinion of the International Searching Authority for PCT/EP2011/001306 dated Nov. 11, 2011 (Form PCT/ISA/237) (German Translation).
International Search Report for PCT/EP2011/001306 dated Nov. 11, 2011 (Forms PCT/ISA/220, PCT/ISA/210) (German Translation).

* cited by examiner

*Primary Examiner* — Brian O'Connor
(74) *Attorney, Agent, or Firm* — Buchanan Ingersoll & Rooney PC

(57) ABSTRACT

In a method for setting up a communication link between a first telephony terminal (PA) and a second telephony terminal (PB) in a communication network which transports data packets, in particular on the Internet, with the aid of at least one signalling Server (SA, SB), in particular with the aid of an SIP Server, the first telephony terminal informs a first signalling Server that a call is intended to be made to the second telephony terminal. The first signalling Server which has been informed or a second signalling Server which has been informed by this first signalling Server recognizes that the call is intended to be made with a particular quality of Service and sets up a communication link between the first telephony terminal and the second telephony terminal, which link corresponds to this quality of Service.

20 Claims, 3 Drawing Sheets

METHOD FOR SETTING UP A COMMUNICATION LINK

CROSS-REFERENCE TO RELATED APPLICATIONS

This application is the United States national phase under 35 U.S.C. §371 of PCT International Application No. PCT/EP2011/001306, filed on Mar. 16, 2011.

BACKGROUND OF THE INVENTION

1. Field of the Invention

Embodiments present methods for establishing a communication connection between a first and a second telephone terminal in a communication network that carries data packets, in particular on the Internet, using at least one signaling server, in particular a SIP server.

2. Background of the Related Art

Such methods are essentially known, in particular under the name Voice over IP (VoIP).

DE 102008009925 A1, for example, discloses a method and a device for setting up an Internet telephone connection by utilizing the Session Initiation Protocol (SIP). According to it, the tasks usually performed by a SIP provider's devices are taken up by units in a dedicated internet connection system specifically designed for this purpose, which within the scope of the invention is assigned to a subscriber who is part of a user group. This dedicated internet connection system comprises in particular a SIP registrar, a SIP location server, and a SIP proxy server or a SIP redirect server.

DE 102006031080 A1 discloses a method for providing Voice over IP (VoIP) in a communication system with multiple terminals that function according to VoIP and between which voice data are transmitted according to VoIP or signaling, wherein signaling is achieved based on the Computer Supported Telecommunication Application (CSTA) interface standard.

BRIEF SUMMARY OF THE INVENTION

Embodiments provide methods for establishing a communication connection between a first and a second telephone terminal in a communication network that carries data packets, with which it is possible to transmit data packets with different priorities in the communication network and in this manner to provide a data connection with a service quality as required by the respective user.

According to embodiments of the invention, a method is provided for establishing a communication connection between a first and a second telephone terminal in a communication network that carries data packets, in particular on the Internet, using at least one signaling server, in particular a SIP server, wherein the method includes preferably the following and potentially additional steps:

a) The first telephone terminal informs a first signaling server that a call shall be placed to a second telephone terminal;

b) The informed first signaling server or a second signaling server that has been informed by the first signaling server recognizes that a call with a particular quality of service shall be placed and sets up a communication connection between the first and second telephone terminals, said connection corresponding to that quality of service.

Figure 1:
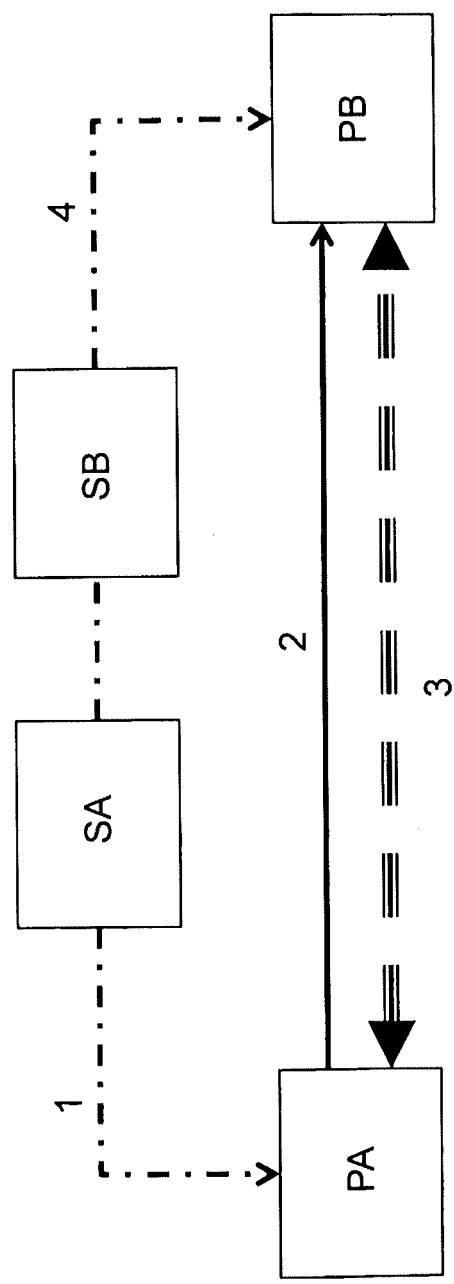
FIG. 1, schematically, an invented connection setup according to a first preferred embodiment of the invention.

As used herein, a signaling server refers to an exchange service in the form of a server, where the used telephone terminals can register themselves such that the server knows the current IP address of the telephone terminal. Using this IP address of the telephone terminal, the signaling server, for example a SIP server, can handle switching of telephone calls in packet-switched networks such as computer networks.

The Session Initiation Protocol (SIP) is a network protocol used to set up, control, and terminate a communication session between two or more telephone terminals. The protocol is specified in RFC 3261, among others.

In this context, the term quality of service shall refer to the quality of a communication service, preferably from the perspective of the user. Formally, the quality of service is a set of quality requirements on the communication service in use.

Examples of such requirements are the user's desire to be connected to the target as desired and after conclusion of the communication to be disconnected reliably, quick establishment of a communication connection, the stable maintenance of a communication connection, good speech comprehensibility, in particular for telephone connections, complete transfer of the payload with the lowest possible error rate, separation from other communication subscribers' information and to a large extent lack of interference, minimizing delays and correct billing for the communication according to duration and amount of transferred data.

In packet-switched networks such as IP networks, quality of service is often covered using parameters which, for example, include latency, i.e., the delay of the transmission from terminal to terminal, jitter, i.e., the deviation of latency from its mean value, and packet loss rate, i.e., the probability that individual IP packets are lost during transmission, or—in particular with real-time services such as telephone applications—that they reach the destination too late. In addition, quality of service is also influenced by the throughput, i.e., by the average data amount transmitted per unit of time. In real-time communication applications such as internet telephony (Voice over IP), latency, jitter and loss rate significantly influence speech comprehensibility.

According to one preferred embodiment of the invention, the invented method is furthermore characterized in that the first or second signaling server communicates to one of the telephone terminals a quality-of-service identifier that corresponds to a certain quality of service, said quality-of-service identifier preferably being a quality-of-service profile ID or information that is derived from this quality-of-service identifier, preferably the respective Differentiated Services Code Point (DSCP). The telephone terminal that has been informed in this manner transmits this quality-of-service identifier or the information derived from said quality-of-service identifier to the respective other telephone terminal, preferably by using the Session Description Protocol (SDP). This allows the other telephone terminal to configure itself according to said quality of service.

The Session Description Protocol (SDP) is specified in RFC 4566. Properties of multimedia data streams are described using the Session Description Protocol (SDP).

It is used to manage communication sessions and is employed, for example, together with SIP and H.323 in IP telephony when negotiating codecs, transport protocols and addresses and to transfer metadata. SDP itself does not offer its own negotiation mechanisms, rather only a description of the data streams. Data sets in SDP format can be transferred using different types of transport protocols, e.g., also using "transport protocols" such as e-mail.

Within a method known as DiffServ, a Differentiated Services Code Point (DSCP) usually refers to per-hop behavior (PHB). It specifies the manner in which packets shall be handled. DiffServ (short for Differentiated Services) is a scheme for classifying IP packets. This classification can be used to prioritize IP data packets to ensure quality of service (QoS). DiffServ was first described in 1998 in RFC 2474.

The original specification of IPv4 in RFC 791 defined a Type-of-Service byte (ToS byte) in the IP header. Three bits were used to encode precedence between 0 and 7, and three additional bits marked packets for low latency, high throughput and high reliability. A later RFC gave one of the remaining bits the meaning of "minimize financial cost".

DiffServ describes an alternative method for using the bits of the ToS byte: the original six bits (now referred to as "DS field") encode a Differentiated Services Codepoint (DSCP) between 0 and 63. In RFC 3168, the remaining two bits are used for Explicit Congestion Notification (ECN).

In general, DSCPs are used for classifying but not for prioritizing. This means that a higher numeric value does not necessarily correspond to preferred treatment. It is typically intended to provide a classification of the packets, for example based on port numbers at the borders of a network, for example at border routers. Routers within the network, on the other hand, utilize the DS field only for selecting a PHB.

In several RFCs, per-hop behaviors (PHBs) are defined and are suitable for various types of network traffic and resource management. The respective DSCPs are managed and assigned by the IANA. Class Selector PHBs (RFC 2474) are backward-compatible to the eight precedence values from RFC 791 and are representatives of priority-based resource distribution. Expedited Forwarding (EF, RFC 3246) describes a behavior for packets that require low latency. Assured Forwarding (AF, RFC 2597) describes a PHB that divides packets into four classes with three priorities each. The standard behavior with the Codepoint 0 is referred to as Best Effort (BE).

According to another preferred embodiment of the invention that can also be combined with other embodiments, a method is provided wherein at least one first data packet with a first quality of service corresponding to the scope of the established communication connection is transmitted, where said first quality of service is different from a second quality of service, according to which at least one second data packet is transferred within the scope of the established communication connection.

Using this and other embodiments of the invention, it is possible to provide and utilize a certain required quality of service (QoS) in packet-switched communication networks, in particular in IP networks, such that an essentially interference-free internet telephone operation on Voice over IP (VoIP) is possible. Individual data packets can be transmitted with a higher priority than other data packets, thereby ensuring that data to be transferred in real time (real-time media data) pass through the communication network and reach the communication partner with very little delay, little jitter and low packet loss.

According to another preferred embodiment of the invention, whose features can also be combined with features of other embodiments, at least one first data packet is transferred within the scope of the established communication connection according to a first value of the Differentiated Services Code Point (DSCP), which is different from a second value of the Differentiated Services Code Point (DSCP), according to which at least one second data packet is transferred within the scope of the established communication connection.

According to another preferred embodiment of the invention, whose features can also be combined with features of other embodiments, at least one signaling server communicates to a telephone terminal to which said signaling server is assigned a quality-of-service identifier or respective information that represents a quality of service, preferably with the aid of signaling according to the Session Description Protocol (SDP).

According to another preferred embodiment of the invention, whose features can also be combined with features of other embodiments, at least one first telephone terminal communicates to at least one second telephone terminal a quality-of-service identifier or respective information that represents a quality of service, preferably with the aid of signaling according to the Session Description Protocol (SDP).

According to another preferred embodiment of the invention, whose features can also be combined with features of other embodiments, the L3 quality-of-service value of the Differentiated Services Code Point (DSCP), also known as L3 QoS value, is signaled directly, but not the L2 QoS value according to IEEE 802.ID. This embodiment of the invention is employed in particular when the DSCP value can be used in all sub-networks of the communication network. In such a case, the embodiment has the advantage that the telephone terminal does not need to process or store local data.

According to another preferred embodiment of the invention, whose features can also be combined with features of other embodiments, a preferably numeric or alpha-numeric identifier is transferred instead of at least one quality-of-service value of the Differentiated Services Code Point (DSCP) and is used to determine at least one quality-of-service value to be used in a telephone terminal to which an identifier is being or has been transferred. Although such embodiments of the invention require storing and processing small amounts of data (see table 1 below, for example) in the terminal, this embodiment of the invention offers the advantage that local settings can generally be according to the user's specifications, which makes this solution appear particularly attractive.

A profile ID, for example a "5" that may stand for "highest priority," for example, can be signaled from end to end. However, which concrete L2/L3 values are to be used in the various network sections that are to be traversed (administrative domains such as "Company 1", "Provider X", "Company 2") in order to achieve the highest priority cannot be seen and therefore also not specified outside of such a domain. For example, if subscriber A communicates to subscriber B that a message or a single packet is to be transmitted according to profile ID "5," then each network section will simply use those L2/L3 values that have been stored under profile "5" in the profile table of the respective domain (the "small amounts of data" mentioned above) according to local specifications.

Preferably, signaling protocols, in particular the Session Initiation Protocol (SIP) and the Session Description Protocol (SDP) are expanded for this purpose such that it becomes possible to activate explicitly one quality-of-service profile and/or to recommend or request certain L2/L3 quality-of-service values from the communication partner, even beyond administrative borders. This procedure is also transferable to other protocols such as the H.323 protocol. In this context, media types such as video (VVoIP) or other future media types shall be included, even if only Voice over IP (VoIP) is mentioned for simplicity's sake.

A quality-of-service profile consists preferably of L2 quality-of-service values (IEEE802.1D) and L3 quality-of-service values (DSCP). A number of these profiles, for example 5, can be stored in the terminal, preferably in a table, and then selected via a quality-of-service profile ID communicated in the SIP or SDP message. Such a table may look as follows:

TABLE 1

Exemplary table for storing profiles in the terminal unit

| ID | L2/IEEE802.1D | L3/DSCP |
|---|---|---|
| 0 | 0 | 0 |
| 1 | 4 | 34 |
| 2 | 5 | 40 |
| ... | ... | ... |

In the course of SIP signaling, the profile to be used can be communicated from the SIP server to the terminal by transferring the profile ID (e.g., "2").

The terminal utilizes the associated L2 value (here "5") directly at its Ethernet interface, in order for the L2 SIP servers to process the packets (MAC frames) correctly according to priority.

On the other hand, the terminal utilizes the associated L3 value (here "40") in the RTP-IP packets at L3, in order for the routers to process the packets (IP) correctly according to priority, and signals this value, potentially via SDP, to its communication partner (in the case of the previously-described direct value transfer).

Unlike direct signaling of the L2/L3 values, this procedure offers the advantage that a logic value is transferred which is converted to quality-of-service values only in the terminal, or in case of domain borders also in the SBC (see FIG. 3), according to the policies applicable there (in the respective sub-network). The L2 value is only of local importance. Thus, different values (including "no L2 quality of service value") can be requested in different sub-networks. For this reason, an administrator should be able to modify the table shown above, although standardized profiles are generally used for normal operation and as administration templates.

According to another preferred embodiment of the invention, whose features can also be combined with features of other embodiments, at least one signaling server recognizes, based on a dialed telephone number or based on special signaling, that a call is to be carried out with a particular priority and that thereupon this signaling server communicates to the telephone terminal initiating the call a respective quality-of-service profile identifier or corresponding information.

According to another preferred embodiment of the invention, whose features can also be combined with features of other embodiments, a telephone terminal determines, from the quality-of-service profile communicated to it, a quality-of-service value that shall be used and uses it for the connection according to the Real-Time Transport Protocol (RTP).

The invention is described below in more detail, based on preferred exemplary embodiments and with reference to the figures.

As shown schematically in FIG. 1, a connection is established between a first telephone terminal (PA) and a second telephone terminal (PB) using two signaling servers (SA, SB). According to a first exemplary embodiment of the invention, as soon as the signaling server (SA) recognizes on the side of the telephone terminal PA that the call to be set up shall be carried out with a particular priority, the signaling server SA, preferably a SIP server, communicates to the terminal PA initiating the call, via VoIP signaling, the associated quality-of-service profile ID, in this case "qos_prof ile=2" with 1. After converting the profile ID to concrete quality-of-service values, which the telephone terminal PA uses preferably for its RTCP connection 3, the telephone terminal PA communicates to the telephone terminal PB preferably the L3 QoS value to be used via the Service Description Protocol (SDP) with 2, so that both connected devices are now provided with the special quality-of-service settings.

In another preferred exemplary embodiment, the telephone terminal PA evaluates the profile ID received 1 from the signaling server SA and then does not transfer the profile ID to its communication partner but instead directly transfers 2 the resulting DSCP value, in the example of table 1 the value "dscp=40."

Figure 2:
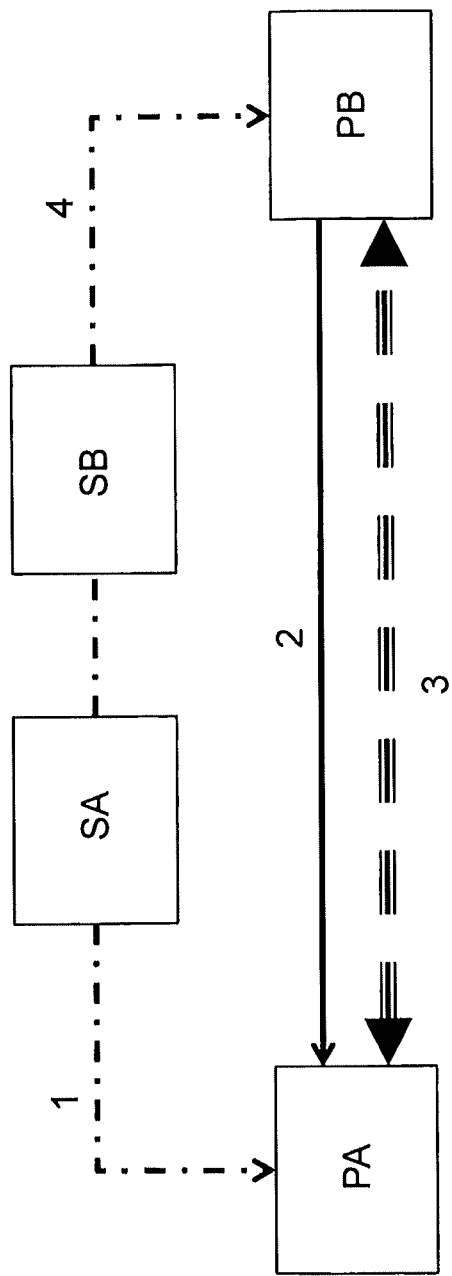
FIG. 2, schematically, an invented connection setup according to a second preferred embodiment of the invention.

If a signaling server, for example a SIP server on the side of the telephone terminal PA, does not support recognizing special calls, or if the server on the side of the telephone terminal PA cannot recognize an emergency call, for example due to call re-routing, the signaling server SB can effect a priority modification according to another exemplary embodiment of the invention as shown schematically in FIG. 2. Preferably this can be done by having the signaling server SB on the side of the telephone terminal PB provide said telephone terminal PB with a quality-of-service profile ID 4. The telephone terminal PB evaluates this quality-of-service profile ID preferably by using the values themselves and communicates the quality-of-service profile ID or corresponding information, for example the L3/DSCP value, to the telephone terminal PA.

This embodiment of the invention is of particular interest in some emergency call scenarios, because raising the priority needs to be effected only in the emergency call center. Based on the transmitted quality-of-service value, all caller terminals can automatically follow the new setting.

In case the telephone terminal PA does not support a quality-of-service setting via the service of the Service Description Protocol (SDP), it can operate preferably with the quality-of-service setting that it would use anyway. That makes this solution fully backward-compatible. Although in this case the quality improvement as intended by the invention would not occur, the connection would not be negatively influenced either.

Figure 3:
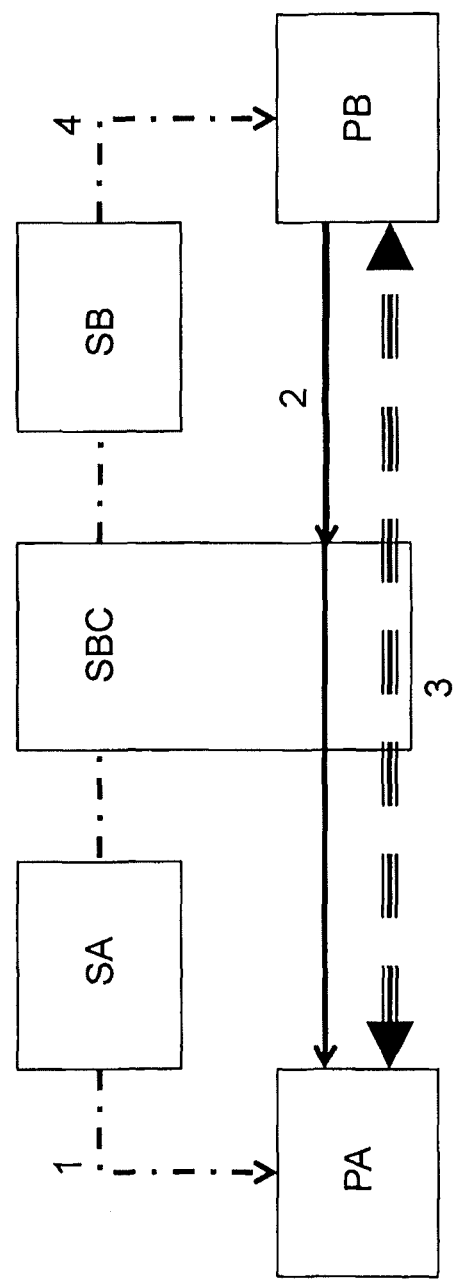
FIG. 3, schematically, an invented connection setup according to a third preferred embodiment of the invention.

In some application scenarios, an embodiment as shown schematically in FIG. 3 is used. With these application scenarios, the DSCP values contained in the IP messages are often dropped at the administrative borders (for example at the transition point from a corporate network to a provider network) and reset according to local policies. In such cases, existing knowledge about emergency calls is potentially lost. In this case, explicit signaling of the quality-of-service profile ID, which is preferably secured against tampering using means that are typical for signaling and known to a person skilled in the art, can result in a quality-of-service priority modification that is effective beyond such borders. This can occur, for example, through evaluating the quality-of-service information in SDP signaling in the Session Border Controller (SBC).

This embodiment too has the advantage of backward-compatibility. If SBC did not support a quality-of-service setting via SDP, it would operate using the quality-of-service settings that it would use anyway. That means that this solution is fully backward-compatible. The quality improvement of the invention would not occur, of course, but the connection would not be negatively influenced either.

An expansion of the Session Initiation Protocol (SIP) for transmitting the quality-of-service profile ID from a SIP server to a terminal could occur preferably by adding an additional attribute to the SDP body of a SIP message. Within the scope of this description, this attribute is called "qos_prof ile". It indicates to the recipient of this message to use, if possible, the L2/L3 quality-of-service values stored under ID "2" for the media stream to be transmitted. For example, if the telephone on the side of subscriber A communicates to the telephone on the side of subscriber B to use a qos_prof ile=2, it would mean that A will use this value for its media stream to B and that B, if possible and if this attribute is understood, should also use the corresponding values for its media stream to A.

Protocols SIP and SDP are designed such that information that is not understood can simply be ignored. This recommended method is therefore also backward-compatible and suitable for terminals that do not understand the recommended expansion.

The SDP attribute can be specified at both session level and media level. If it is specified at session level, then it applies to all recommended media streams. If it is specified at media level, it applies only to the respective media stream. This makes it possible to use different L2/L3 quality of service values also for different media streams. For example, at the media level one could assign a higher priority to a media stream for voice and a normal quality-of-service level for an associated video media stream, because as a rule interference-free voice transmission is more important than an interference-free video.

According to RFC4566, the ABNF notation for SDP attributes is:

attribute-fields=*(% x61 "-" attribute CRLF)

attribute=(att-field ":" att-value)/att-field att-field=token att-value=byte-string According to a preferred embodiment of this invention, the following ABNF notation is recommended for the SDP attribute:

a="qos_profile:" qos-att-values qos-att-values=*(qos-att-value)

qos-att-value=integer

An expansion of the Session Description Protocol for transferring the quality-of-service profile ID to a communication partner can preferably occur by communicating the L3 value, which potentially is significant end-to-end, to the communication partner and potentially all entities that are located in between and are involved in the payload (for example SBCs) explicitly for signaling. In this manner, it is possible to require a certain L3/DSCP value for the data stream to be negotiated.

Currently, data stream parameters are negotiated in the Session Description Protocol (SDP). This includes the codecs to be used (including the codec parameters), IP addresses, ports and some other information, but until now no data that deal with the quality of service.

Within the context of one preferred exemplary embodiment of the invention, it is now recommended to introduce a new SDP parameter "a=qos_profile:<qos_profile>"

in the SDP body. This SDP body communicates to the recipient of the SDP body which codec is to be used and to which IP address and which port with which quality-of-service profile the media stream shall be transmitted.

The quality-of-service value that is to be employed by the transmitting terminal has either been communicated to the terminal in the manner shown above by the SIP server via quality-of-service profile ID or determined based on permanently encoded policies (or standard quality-of-service profile) (standard VoIP call).

Signaling within the scope of a respective expanded Session Initiation Protocol could look like this:

INVITE sip:2001@10.26.22.102:5060;transport=udp SIP/2.0

Via: SIP/2.0/UDP 10.26.110.104; branch=z9hG4bK555e2b285cfdb54dd

Max-Forwards: 70

From: 498970072000 <sip:498970072000@10.26.22.102>;tag=09c3e39f93;epid-SCBCC441

To: <sip:2001@10.26.22.102.5060;transport=udp>

Call-ID: 8770b985466fc961

CSeq: 2124145486 INVITE

Contact: 498970072000 <sip:498970072000@10.26.110.104:5060;transport=udp>

Content-Type: application/sdp

Content-Length: 291 v=0 o=MxSIP 0 1695602043 IN IP4 10.26.110.104 s=SIP Call c=IN IP4 10.26.110.104 t=0 0 m=audio 5010 RTP/AVP 8 0 18 101 a=rtpmap:8 PCMA/8000 a=rtpmap:0 PCHU/8000 a=rtpmap:18 G729/8000 a=rtpmap:101 telephone-event/8000 a=silenceSupp:off - - - - a=fmtp:18 annexb=no a=fmtp:101 0-15 a=qos_profile:2

In this validation example, it is recommended to the communication partner to use the DSCP value "40" for this call and for this media stream according to quality-of-service profile "2". The present invention is not concerned with negotiating a quality-of-service mechanism but rather with specifying a certain quality-of-service value that applies to a certain call via signaling. In this context, the invention allows in particular explicit signaling of the quality-of-service settings, such as the profile ID or the DSCP values for a certain media stream.

We claim:

1. A method for establishing a communication connection between a first terminal and a second terminal in a communication network comprising:

a) informing a first signaling server, through a first terminal, that the first terminal seeks to establish a communication connection between the first terminal and a second terminal;

b) through the first signaling server or a second signaling server that has been informed by the first signaling server, recognizing that the communication connection is to be formed such that transmission of data along the formed communication connection has a first quality-of-service and communicating information identifying the first quality-of-service to at least one of the first terminal and the second terminal for use in transmitting data between the first and second terminals in accordance with the first quality-of-service.

2. The method of claim 1, wherein the communicating information identifying the first quality-of-service to at least one of the first terminal and the second terminal for use in transmitting data between the first and second terminals in accordance with the first quality-of-service comprises: communicating, through the first or second signaling server to one of the first terminal and the second terminal, a quality-of-service identifier corresponding to the first quality-of-service, and the method also comprises:

configuring transmission settings for transmission of data along the communication connection in accordance with the first quality-of-service, by the one of the first terminal and the second terminal that received the quality-of-service identifier from the first signaling server or the second signaling server, transmitting, by the one of the first terminal and the second terminal that received the quality-of-service identifier, the quality-of-service identifier to the other of the first terminal and the second terminal to cause that terminal to be configured for transmission of data via the communication connection in accordance with the first quality-of-service.

3. The method of claim 2, comprising transferring at least one first data packet within the communication connection according to the first quality-of-service, which is different from a second quality-of-service, and transferring at least one second data packet according to the second quality-of-service via the communication connection.

4. The method of claim 3, wherein the at least one first data packet is transferred via the communication connection according to a first value of a Differentiated Services Code Point (DSCP), which is different from a second value of the DSCP according to which at least one second data packet is transferred via the communication connection.

5. The method of claim 1, wherein the first signaling server communicates to the terminal, which is assigned to said first signaling server, at least one of a quality-of-service identifier and corresponding information specifying a quality-of-service according to a Session Description Protocol (SDP).

6. The method of claim 1, comprising:
communicating, by the first terminal, at least one of a quality-of-service identifier and corresponding information specifying the first quality-of-service to the second terminal via a message that has a body formed in accordance with Session Description Protocol (SDP) containing the at least one of the quality-of-service identifier and corresponding information specifying the first quality-of-service.

7. The method of claim 6, wherein a L3 quality-of-service value of a Differentiated Services Code Point (DSCP) is signaled directly between the first and second terminals.

8. The method of claim 6, wherein a numeric identifier or an alpha-numeric identifier is transferred between the first and second terminals, the numeric identifier or the alpha-numeric identifier being configured so that the first terminal and the second terminal each determine the first quality-of-service from that identifier.

9. The method of claim 1, wherein the first signaling server recognizes, based on one of a dialed telephone number and particular signaling, that a call with a particular priority has been placed by the first terminal, causing the first signaling server to communicate to the first terminal one of a quality-of-service profile identifier for the first quality-of-service and information corresponding to the quality-of-service profile identifier for the first quality-of-service.

10. The method of claim 9, comprising determining, through the first terminal, from the quality-of-service profile communicated to it, a quality-of-service value; and using the quality-of-service profile for a communication connection formed between the first and second terminals according to Real-Time Transport Protocol (RTP).

11. The method of claim 1, wherein the first terminal is a telephone and the second terminal is a telephone.

12. The method of claim 1, wherein the communicating information identifying the first quality-of-service to at least one of the first terminal and the second terminal for use in transmitting data between the first and second terminals in accordance with the first quality-of-service comprises:

transmitting, by the first signaling server, information identifying the first quality-of-service to the first terminal;
and wherein the method further comprises:
evaluating, by the first terminal, the information identifying the first quality-of-service received from the first signaling server; and
transmitting, by the first terminal, a first message identifying one of a profile identification identifying the first quality-of-service and a Differentiated Services Code Point (DSCP) value corresponding to the first quality-of-service to the second terminal.

13. The method of claim 12, wherein the second signaling server is associated with the second terminal, the method comprising:

transmitting, by the second signaling server, information for a second quality-of-service for the communication connection for use in modifying a priority of quality-of-service assigned to the communication connection between the first and second terminals;
evaluating, by the second terminal, the information for the second quality-of-service;
transmitting a second message having information identifying the second quality-of-service from the second terminal to the first terminal to increase the quality-of-service priority for the communication connection between the first and second terminals.

14. The method of claim 13, comprising:
evaluating, by a session border controller, information in the second message identifying the second quality-of-service.

15. The method of claim 1, wherein the communicating information identifying the first quality-of-service to at least one of the first terminal and the second terminal for use in transmitting data between the first and second terminals in accordance with the first quality-of-service comprises:

the first signaling server transmitting a first message to the first terminal that identifies the first quality-of-service in a Session Description Protocol (SDP) attribute included in the first message, the SDP attribute identifying the first quality-of-service for transmission of media data between the first terminal and the second terminal via the communication connection.

16. A communication system comprising:
a first terminal;
a second terminal;

a first signaling server communicatively connectable to the first terminal;

the first signaling server being configured to recognize that the first terminal has requested formation of a communication connection between the first and second terminals for transmission of media data and is configured to communicate information identifying a first quality-of-service determined to be assigned to the communication connection to the first terminal for use in transmitting data between the first and second terminals in accordance with the first quality-of-service via the communication connection.

17. The system of claim 16, wherein the first signaling server is configured to send a message having a quality-of-service identifier corresponding to the first quality-of-service to the first terminal; and the first terminal is configured to configure a setting of the first terminal for transmission of media data to the second terminal along the communication connection in accordance with the first quality-of-service in response to receiving the first message from the first signaling server; and the first terminal is also configured to send information identifying the first quality-of-service to the second terminal to cause the second terminal to be configured for transmission of media data via the communication connection in accordance with the first quality-of-service.

18. The system of claim 17, comprising:

a second signaling server communicatively connected to the second terminal;

the second signaling server configured to transmit a second message to the second terminal, the second message having information identifying a second quality-of-service for the communication connection for use in modifying a priority of quality-of-service assigned to the communication connection between the first and second terminals;

the second terminal configured to respond to receiving the second message by evaluating the information identifying the second quality-of-service and transmitting a third message having information identifying the second quality-of-service from the second terminal to the first terminal to increase a quality-of-service priority for the communication connection between the first and second terminals.

19. The system of claim 16, wherein the first terminal is a telephone and the second terminal is a telephone.

20. The system of claim 19, wherein the information identifying the first quality-of-service determined to be assigned to the communication connection to the first terminal is a Session Description Protocol (SDP) attribute included in a message sent from the first signaling server to the first terminal, the SDP attribute identifying the first quality-of-service for transmission of media data between the first terminal and the second terminal via the communication connection.

* * * * *